Dec. 25, 1934.  F. MARIANI  1,985,574
MACARONI MACHINE
Filed April 4, 1932   3 Sheets-Sheet 1
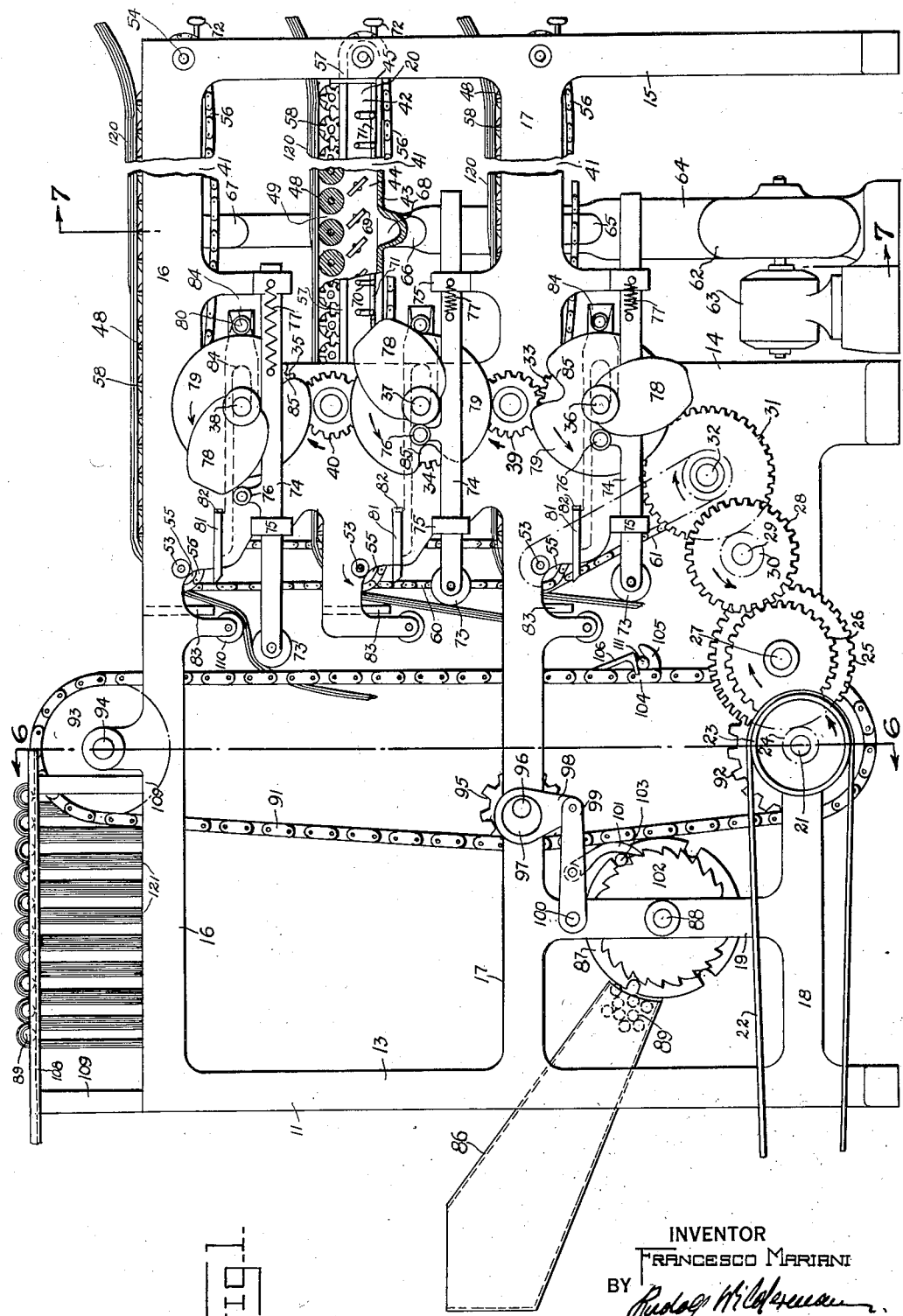
INVENTOR
FRANCESCO MARIANI
BY
Rudolf Wilhelm
ATTORNEY

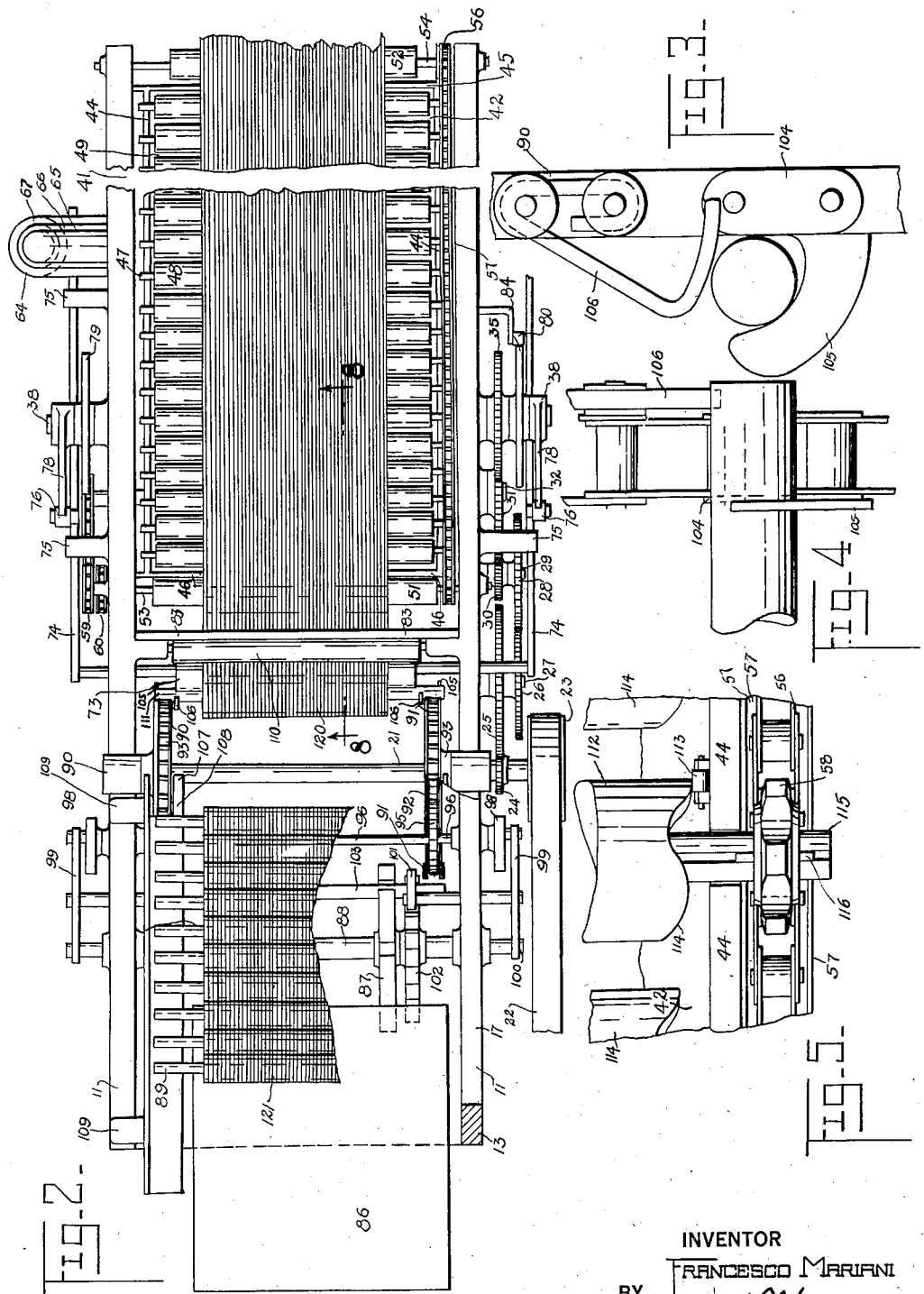

Dec. 25, 1934.  F. MARIANI  1,985,574
MACARONI MACHINE
Filed April 4, 1932  3 Sheets-Sheet 3
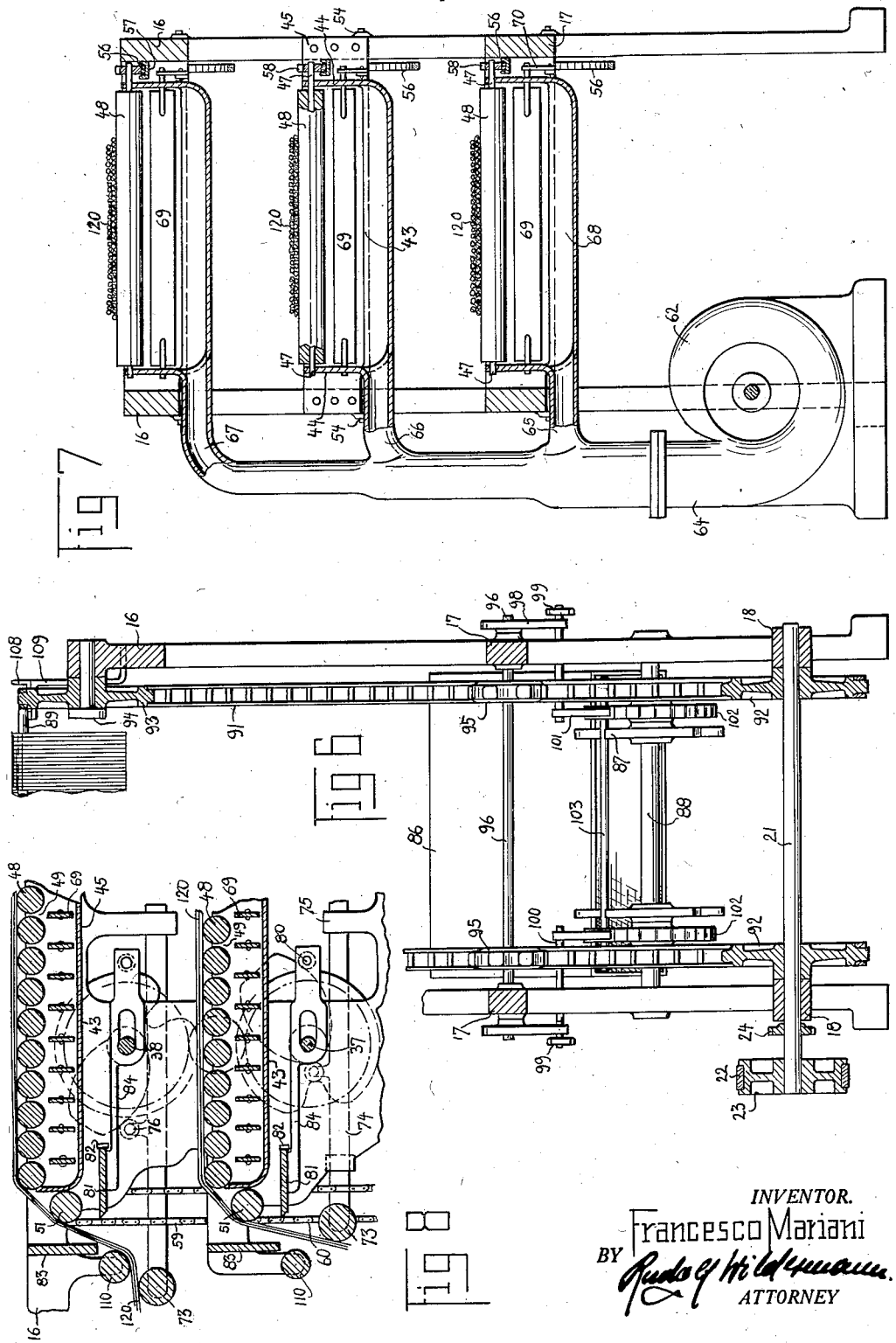
INVENTOR.
Francesco Mariani
BY Rudolf Hildemann
ATTORNEY Patented Dec. 25, 1934

1,985,574

UNITED STATES PATENT OFFICE 1,985,574

MACARONI MACHINE

Francesco Mariani, New York, N. Y.

Application April 4, 1932, Serial No. 602,993

12 Claims. (Cl. 107—14)

This invention concerns a macaroni machine, and more particularly a machine which operates on a multiplicity of macaroni strings delivered from a shaping mould or press.

Those acquainted with this art are familiar with the moulding means or press and also know that the macaroni strings are delivered from such an apparatus and are spread, cut and hung up on sticks in a tedious manual operation.

Some objects of this invention are to perform on a machine the operations which the macaroni strings are subjected to as they are delivered from a mould or press.

More particularly I intend to substitute a time-saving, hygienically preferable, efficient, automatic cycle of coordinated operations for the process of manipulation of the prior art.

The use of my invention further serves to produce a better product by providing greater uniformity in physical respects, i. e., for the purpose of assortment and packaging, as well as in respect to actual quality.

My invention will be better understood from the accompanying drawings. The mould or press is not shown, but exemplarily the strings of macaroni coming from such a mould or press in a downward direction are carried or delivered in bunches or groups onto the three levels exemplarily shown in the partly schematic drawings in which:

Fig. 1 is a side elevation of my machine.

Fig. 2 is a corresponding top view.

Figs. 3 and 4 show, in detailed face and side views, a section of a carrier chain.

Fig. 5 shows, in an enlarged top view, modified conveyor elements.

Figs. 6 and 7 show sectioned end views of the machine taken at the points and in the directions indicated by arrows and the respective numerals in Fig. 1; and Fig. 8 shows a sectioned detail side view taken as indicated in Fig. 2.

Similar numerals refer to similar parts throughout the various views:

The machine of the drawings shows the use of two substantially parallel side frames 11 and 12 which are suitably spaced apart by tie rods, braces or cross-members (not shown) as known to those acquainted with industrial machinery. The three risers 13, 14 and 15 of each frame are suitably connected by a top member 16 and an intermediary member 17. The risers 13 and 14 are also connected by a bottom member 18. The members 17 and 18 are again connected by a riser 19.

The exemplary showing of the machine has three operating levels, each of which comprises a conveyor table at the right, rear end of the machine. Two of these conveying tables extend substantially between the top members 16 and the intermediary members 17, respectively. A third conveying table 20 is interposed substantially centrally between the members 16 and 17.

A suitable motor (not shown) drives the main shaft 21, by means of a belt 22 and pulley 23. A pinion 24 connects to the larger one (25) of the two idler gears 25 and 26 which are attached to each other and rotate around a stud 27 on the frame 11.

The smaller gear 26 meshes with the gear 28 which idles on stud 29. The pinion 30 which is attached to gear 28 and which rotates therewith on stud 29 meshes into a gear 31 on shaft 32 which extends across and is rotatably mounted in the frames 11 and 12. The gear 31 drives a chain of gears 33, 34 and 35 which are mounted on the cam shafts 36, 37 and 38, respectively. The three smaller gears 33, 34 and 35 drive the cam shafts in the same direction of rotation at like speeds, intermediary idler gears 39, and 40 being interposed in the said chain of gears, for the purpose of attaining said object.

These three conveying tables and the mechanism used in connection with each of said tables are constructed substantially alike, so that they may conveniently be described by means of the showing of the center table 20, as seen in Fig. 1, and the top table which is exposed to view in Fig. 2. The length of the conveying tables is chosen to allow sufficient time for the spreading of the bunched strings 120 of macaroni, fed thereonto from the mould or press, (not shown). For purposes of the drawings, a section of said tables, and of the corresponding parts of members 16 and 17 has been omitted at 41 in the drawings.

The three operating tables comprise boxes 42, which substantially extend and are supported between the frames 11 and 12. The boxes 42 are closed by bottom 43, sides 44 and ends 45, and 46, so that they are only open at their top sides. The opposite sides 44 of the boxes are registeringly notched along their upper extents at suitable intervals, said notches being adapted rotatably to support the shafts 47 of the rollers 48, in such a manner that the rollers may be deposited in said notches from the top. Rollers 48 are of such diameter, that they substantially close the top of the box 42, said rollers being spaced to leave narrow slots 49 between each other. Outside of the boxes, at the ends thereof, are rotatably mounted the larger rollers 52 and 51 on the frames 11 and 12. The three sets of rollers 48, 51 and 52 offer supports in an upward direction for the macaroni upon the surfaces of the three conveying tables.

The shafts 53 and 54 of rollers 51 and 52 carry sprockets 55, which are connected by endless chains 56. The chains are supported along their upper extent by channels 57 which are fastened upon the sides of the boxes 42, the chains sliding on the bottoms of said channels. The channels 57 are mounted at such a height upon the sides of the boxes, that chains 56 engage upon sprockets 58 which are mounted upon the ends of shafts 47 of rollers 48. If the sprockets 55 are rotated in clockwise direction, the rollers 48 feed the macaroni resting thereupon from the right to the left. The shaft 53 of the sprocket of the top conveying table, which aligns with members 16 is driven by a sprocket and chain 59 from the corresponding shaft 53 of the center conveying table 20. The latter shaft 53 is in turn connected by a sprocket and chain 60 to the shaft 53 of the lowest conveying table which aligns with member 17. The latter shaft 53 is connected by sprocket and chain 61 to shaft 32.

The driving ratio between the shaft 32 and the lowest shaft 53 may be changed by a change of the sprocket and chain drive 61, so that the feeding speed on the conveying tables may be changed in relation to the speed of rotation of the cam shafts 36, 37 and 38.

Below the machine I show a blower 62 which is driven independently by a motor 63. The air is driven from the outlet 64 of the blower through conduits 65, 66 and 67 into the three boxes 42, the conduits opening into said boxes through a hole 68 in the bottom thereof, as shown in connection with the sectioned part of the center conveying table 20. In the boxes 42 I arrange a plurality of damper plates 69 underneath the rollers 48. The shafts 70 of these damper plates protrude on one side from the box and are there hinged by crank levers upon a longitudinal rod 71. By means of the handle 72 fastened upon the end of the rod 71, which extends from the rear of the machine, the damper plates 69 may be moved in parallelism to each other, swinging between substantially vertical and substantially horizontal positions, so that the draft set up by blower 62 and passing from the boxes through the slots 49 may be regulated. The current of air which strikes the strands 120 of macaroni fed over the conveying tables may thus be controlled so as to play on said macaroni with such strength so as suitably to spread the macaroni, as they travel to the left on the conveying tables over the rollers 48.

The ends of the strands of the macaroni which thus pass over the conveying table are fed down over rollers 51 and pass onto the rollers 73, provided the said roller is in the position in which it is shown in connection with the center or bottom conveyng tables. The rollers 73 are rotatably supported between the free ends of the longitudinal slides 74. These slides are supported in boxes 75 extending from the sides of the frames and provided with rollers 76, which under the tension of springs 77 engage upon cams 78.

The rotation of shafts 36, 37 and 38 will therefore push the rollers 73, successively, to the left, the rollers 73 on the top slide 74 being shown in such extreme position to the left or rather close to it.

Another set of cams 79 is provided upon the shafts 36, 37 and 38, upon which are engaged the rollers 80 which actuate the cutting knives 81. The cutting knives 81 are reciprocatingly slidingly arranged in slides 82 on the frames, and are brought into cutting engagement with the vertically disposed bars 83 between frames 11 and 12, when the rollers 80 on the connecting brackets 84 drop, under the tension of springs (not shown), into the recesses 85 of cams 79. It will be seen from the drawings that the cutting off operation takes place shortly after the rollers 76 have passed over the high spots of cams 78.

At the left end of the machine is inclinedly disposed between the frames 11 and 12 a hopper box 86 which is open at both ends. The lower end of hopper box 86 opens onto the notched wheels 87 mounted upon shaft 88, which is journalled on risers 19. As the notches in wheels 87 pass the lower open end of hopper box 86, they engage upon the sticks 89, one at a time, which are contained in the hopper box 86.

A pair of endless chains 90 and 91 travel, on both sides of the machine, between sprockets 92, which are mounted upon the main shaft 21, and sprockets 93, which are idly mounted upon studs 94, extend inwardly from the frames 11 and 12. The chains 90 and 91 engage upon sprockets 95, which are mounted upon a shaft 96 extending across the members 19 of the frame. The shaft 96 carries an eccentric 97 on its end, which is connected by a pitman 98 to lever 99, fulcrumed at 100 upon the riser 19. From the lever 99 depends the pawl 101, which engages upon a sprocket 102 mounted upon shaft 88. It will be understood that normally the pawl 101 rotates the wheels 87 in a clockwise direction bringing sticks 89, which have been received by said wheels from hopper box 86, to the position of stick 103. Upon further rotation of the wheels 87, the pawl 101 is however disengaged from the ratchet 102 by means of stick 103, so that the stick 103 will remain in a position slightly forward of that shown in Fig. 1. After the stick 103 has been removed, as will be explained presently, the pawl 101 again engages upon the ratchet 102 so that another stick is brought into the position of stick 103. One link 104 of chains 90 and 91 has a hook-like construction which angularly protrudes therefrom. Above said link 104, a spring 106 is attached upon chains 90 and 91, which normally extends from the chains in the manner shown in Fig. 1, but which is pushed back onto the chain, substantially into alignment therewith, when the chain passes over the top of sprocket 93. In that instance the spring 106 is depressed by the arm 107 which extends upon the sides of the sprockets 93 from one or the other of the angles 108. These angles represent a rack and are mounted upon brackets 109, extending upwardly from the frames 11 and 12 and are spaced apart substantially at such a distance, that the sticks 89 may be supported between their vertical sides.

When the chains 90 and 91, in their downward travel, pass the wheel 87 the stick 103 depresses the spring 106. The stick 103 is engaged by hook 105 whereupon spring 106 returns into its normal position. The wheels 87 are pulled along, turning a little after the engagement of chains 90 and 91 upon stick 103, only the stick is pulled out of the respective notches of wheels 87 and travel down on the chains 90 and 91 on the left side, and up again on the right side.

The cams 78 and 79 are disposed at different angles upon the shafts 38, 37, 36, and, in rotation, the ends of the macaroni are pushed by the rollers 73 to the left, so that their free ends are, from one level at one time, engaged by the sticks carried up by hooks 105 on chains 90 and 91. After the strands of macaroni have thus been engaged by the said sticks, they are cut off by the knife 81. The intermediary idler roller 110 prevents the strands of macaroni from being engaged by the sharp edge at the lower end of blade 83 before they are cut off. When the sticks, upon which the cut-off macaroni 121 are suspended, have been carried to the top sprockets 93, the springs 106 are disengaged from the stick carried by hook 105 because they slide under the angles 108.

Sticks with macaroni 121 which are fed in this manner onto the angle 108 push the preceding sticks to the left upon said angles, until they are removed by an operator, or by some other automatic conveyor, which feeds the sticks, with the macaroni arranged thereon, to the next step of the process of macaroni manufacture.

In order to bring about the spreading of the macaroni upon the conveying tables, I may not confine myself to the action of the air supplied from the blower 62, but I may also impart a transverse movement to the rollers 48 so that an actual shaking of the conveyor table in respect to the macaroni supported thereby is brought about. Means for these purposes are indicated in Fig. 5 in which the numerals 44, 56, 57 and 58 refer to the corresponding parts of the other drawings, whereas the roller 112 corresponds to the rollers 48. Upon the inside of the wall 44 is mounted a roller 113 transversely protruding therefrom. It engages upon the corrugated face 114 at the end of roller 112; the shaft 115 of roller 112 is provided with feather-keyway 116 so that the sprocket 58 is transversely slidable thereupon. The roller 112 is either pressed by a spring (not shown) onto the corrugated face 114 of roller 113, or the other end of the roller 112 may be provided with a similar, oppositely disposed corrugated face 114 and is engaged by a similar roller 113, so that a reciprocating motion is imparted to the roller 112 while the shaft 115 is rotated by the sprocket 58 which is engaged by chain 56 travelling in the channel 57.

It is also understood that while describing my method and means in connection with macaroni,—using that term for purposes of convenience,—they may also apply to similar foods or articles of manufacture which are delivered in continuous strands or bands which later on are cut into a plurality of ends of similar lengths.

While I have shown and described my invention with some degree of particularity, it will be realized that other modifications and changes may be resorted to under special conditions. I therefore do not wish to be limited and restricted to the exact details shown and described, but reserve the right to make such changes and modifications as may fairly fall within the scope of the subject matter now being claimed.

What I claim is:

1. The method of making macaroni, comprising dividing the multiplicity of continuous strands of macaroni, as delivered by a moulding press, into a plurality of bunches, continuously conveying said bunches at different levels and transversely spreading said bunches while thus conveyed, and cutting like lengths from said spread bunches in rotation.

2. A macaroni machine comprising, a plurality of conveying tables simultaneously and continuously carrying bunches of continuous macaroni strands, means transversely spreading the bunches of strands while thus conveyed, a travellable means facing the delivery ends of said tables and receiving in rotation the ends of the macaroni strands conveyed by said tables, and cutting means facing said tables, actuated in cycle therewith and severing the ends of strands received by said travellable means from the strands conveyed on said tables.

3. A macaroni machine comprising, a plurality of substantially horizontal vertically registering conveying tables simultaneously and continuously carrying bunches of continuous macaroni strands, a substantially vertically travelling means facing the delivery ends of said tables, a horizontally shiftable roller associated with each of said tables, the ends of said strands falling from said tables over said rollers, means shifting said rollers into said travelling means, the ends of said strands being received on said travelling means, and cutting means severing the ends of strands received by said travellable means from the strands conveyed on said tables.

4. A macaroni machine comprising, a plurality of conveying tables simultaneously and continuously carrying bunches of continuous macaroni strands, a travellable means facing the delivery ends of said tables and carrying sticks, a roller shiftably disposed underneath each of said tables, the ends of strands falling from said tables over said rollers, a mechanism successively shifting said rollers during successive cycles over said sticks on said means, said ends being engaged by said sticks when said rollers are withdrawn.

5. A macaroni machine comprising, a plurality of conveying tables simultaneously and continuously carrying bunches of continuous macaroni strands, a travellable means facing the delivery ends of said tables and carrying sticks, said sticks receiving in rotation the ends of the macaroni strands conveyed by said tables, a hopper cyclically placing said sticks onto said travellable means, a stationary rack onto which said sticks are pushed by said travellable means after they have received the ends of the macaroni strands, and cutting means severing the ends of strands received by said sticks from the strands conveyed on said tables.

6. A macaroni machine comprising, a plurality of conveying tables simultaneously and continuously carrying bunches of continuous macaroni strands, a travellable means facing the delivery ends of said tables, transverse means detachably carried by said travellable means, cyclically carried thereby past said tables and adapted dependingly to carry macaroni, extendible carriers supporting said bunches of strands and comprised in said tables, and means cyclically propelling said carriers into said travellable means and aligning the ends of said bunches of strands over said transverse means, and cutting means severing the ends slung over said transverse means from said strands.

7. A macaroni machine comprising, a plurality of conveying tables simultaneously and continuously carrying bunches of continuous macaroni strands, a travellable means facing the delivery ends of said tables, transverse means detachably carried by said travellable means, cyclically carried thereby past said tables and adapted dependingly to carry macaroni, extendible carriers supporting said bunches of strands and comprised in said tables, and means cyclically propelling the carriers of said different tables in cyclical rotation into said travellable means and aligning the 8. A macaroni machine comprising a plurality of conveying tables simultaneously and continuously carrying bunches of continuous macaroni strands, sticks adapted to receive the ends of the macaroni strands conveyed by said tables, an endless travellable means releasably carrying one of said sticks past the delivery end of said tables, means placing one of said sticks onto said travellable means during each cycle of the endless movement thereof, means removing said stick from said travellable means during said cycle after said stick has been carried past said tables, means extending the ends of said strands carried by each of said tables in successive rotation over sticks successively carried by said travelling means during successive cycles thereof, and means severing said ends from the respective strands.

9. In a macaroni machine, a table conveying macaroni strands, a chamber, a plurality of juxtaposed rollers comprised in said table disposed on top of said chamber and conveying said strands, means rotating said rollers, and a blower connected with said chamber, air discharged from said blower into said chamber passing between said rollers onto the strands conveyed by said rollers and transversely spreading said strands upon said rollers.

10. In a macaroni machine, a table conveying macaroni strands, a chamber, a plurality of juxtaposed rollers comprised in said table disposed on top of said chamber and conveying said strands, means rotating said rollers, a blower connected with said chamber, air discharged from said blower into said chamber passing between said rollers onto the strands conveyed by said rollers and adjustable means interposed between said blower and said rollers in said chamber and directing the current of air to pass between said rollers onto said strands and to spread same.

11. The method of making macaroni, comprising dividing the multiplicity of continuous strands of macaroni, as delivered by a moulding press, into a plurality of bunches, continuously conveying said bunches at different levels and transversely spreading and drying said bunches while thus conveyed, and cutting like lengths from said spread bunches in rotation.

12. The method of making macaroni, comprising dividing the multiplicity of continuous strands of macaroni, as delivered by a moulding press, into a plurality of bunches, continuously conveying said bunches at different levels and transversely spreading and drying said bunches while thus conveyed by playing air thereonto from underneath, and cutting like lengths from said spread bunches in rotation.

FRANCESCO MARIANI.